United States Patent [19]

Breakspear

[11] Patent Number: 4,875,962

[45] Date of Patent: Oct. 24, 1989

[54] METHOD FOR LAYING A SHEET OF MATERIAL ON A SURFACE

[75] Inventor: Colin J. Breakspear, Langport, England

[73] Assignee: Westland Group plc, England

[21] Appl. No.: 127,420

[22] Filed: Dec. 2, 1987

[30] Foreign Application Priority Data

Dec. 8, 1986 [GB] United Kingdom ............... 8629267

[51] Int. Cl.$^4$ .................... B32B 31/00; B28B 7/32
[52] U.S. Cl. ............................... 156/245; 156/289; 264/138; 264/314
[58] Field of Search ............ 156/156, 220, 221, 230, 156/235, 239, 241, 249, 248, 361, 382, 494, 488, 493, 540, 541, 580, 583.3, 584, 344, 198, 245, 256; 100/211, 212; 264/572, 313, 213, 314, 215, 157, 158; 427/429; 118/256, 265; 101/33, 34, 43, 44, 492

[56] References Cited

U.S. PATENT DOCUMENTS

| | | | |
|---|---|---|---|
| 3,500,566 | 3/1970 | Holyoke | 100/211 |
| 3,868,901 | 3/1975 | Valiela | 118/205 |
| 4,191,717 | 3/1980 | Weber | 264/313 |
| 4,475,976 | 10/1984 | Mittelstadt et al. | 100/211 |
| 4,511,425 | 4/1985 | Boyd et al. | 156/493 |
| 4,557,790 | 12/1985 | Wisbeg | 156/249 |

Primary Examiner—Michael W. Ball
Assistant Examiner—Louis Falasco
Attorney, Agent, or Firm—Larson and Taylor

[57] ABSTRACT

A method for laying a sheet of material having a sticky texture on to a surface comprises applying pressure by way of a flexible diaphragm to force the sheet of material on to the surface and adjusting the diaphragm so that its surface assumes a varying curved convex shape whereby the diaphragm is peeled gradually from the surface of the sheet of material inwardly from an edge region. The invention is described with particular reference to the laying of sheets of pre impregnated fibre-reinforced material in a mould tool in the automated manufacture of a helicopter rotor blade and several embodiments are disclosed.

6 Claims, 4 Drawing Sheets

METHOD FOR LAYING A SHEET OF MATERIAL ON A SURFACE

BACKGROUND OF THE INVENTION

This invention relates to a method and apparatus for laying a sheet of material on a surface, and is particularly concerned with the laying of such sheet material having a naturally sticky or tacky texture.

One such material consists of a pre-impregnated fibre-reinforced material by which we mean a material comprising a layer of woven, unidirectional or random fibres impregnated with a thermo-setting resin. Such materials are now widely used due to their high strength to weight ratio and the relative ease by which complex shapes can be made using appropriate mould or forming tools, and find particular application in the aircraft industry for example in the manufacture of helicopter rotor blades.

It has been proposed to implement such manufacture by way of automated manufacturing techniques whereby sheets of the material are first cut to shape on a cutting table, then transported robotically from the table and laid on the surface of a mould tool in a predetermined sequence.

Difficulty has been experienced in such an operation since the natural tackiness of the sheet of material due to the resin has caused problems, especially in transferring the sheet of material from a transfer tool onto the mould surface.

In an alternative manufacturing technique known as tape laying, a continuous narrow tape of pre-impregnated fibre-reinforced material is laid directly on to the concave surface of the mould tool. This requires very sophisticated and expensive computer controlled equipment and is not always entirely satisfactory especially for very complex shapes.

Consequently in this specification the use of the term "sheet" is intended to include a sheet cut from a roll of material and a sheet made up of a plurality of adjacently laid narrow tapes.

SUMMARY OF THE INVENTION

Accordingly in its broadest aspect the invention provides a method for laying a sheet of material on to a surface comprising the steps of applying pressure by way of an inflatable flexible diaphragm to force the sheet of material on to the surface, and thereafter adjusting the position of the diaphragm so that the surface of the diaphragm assumes a varying curved convex shape whereby said diaphragm is peeled gradually from the surface of the sheet of material inwardly from an edge region.

The varying curved convex surface may be formed by slowly withdrawing the inflated diaphragm from said surface and the sheet of material thereon.

In another aspect the invention provides a method for laying a sheet of pre-impregnated fibre-reinforced material on to a surface, comprising the steps of locating a transfer tool carrying the sheet of material so that said sheet is in contact with the said surface, inflating a flexible diaphragm between juxtaposed surfaces of the transfer tool and the sheet of material whereby a substantially uniform pressure is applied to force the sheet into contact with the surface, withdrawing the transfer tool from the surface to cause the diaphragm to stretch under the influence of the inflation pressure so as to take up a varying curved convex shape as the transfer tool is withdrawn from the surface whereby the diaphragm is peeled gradually from the surface of the sheet of material inwardly from its edge region, and removing the transfer tool.

Conveniently, in one embodiment, the above method can be preceded by cutting the sheet of pre-impregnated fibre-reinforced material to a desired profile on a generally flat cutting table, locating the transfer tool in proximity with the sheet of material on the cutting table, inflating the diaphragm to apply a uniform pressure over the surface of the sheet of material so that the sheet of material becomes attached to the surface of the diaphragm on the transfer tool, releasing the inflating pressure, and withdrawing the transfer tool and attached sheet of material from the cutting table.

In a further embodiment the aforementioned method may be preceded by forming the sheet of material to a desired profile using a plurality of adjacently laid narrow tapes on a generally flat surface, locating the transfer tool in proximity with the sheet of material, inflating the diaphragm to apply a uniform pressure over the surface of the sheet of material so that the sheet of material becomes attached to the surface of the diaphragm on the transfer tool, releasing the inflating pressure, and withdrawing the transfer tool and attached sheet of material from the surface.

A vacuum may be applied following deflation of the diaphragm whereby the diaphragm and attached sheet of material are drawn into conformity with the shape of the surface of the transfer tool.

In yet a further embodiment, the aforementioned method may be preceded by forming the sheet of material to a desired profile using a plurality of adjacent narrow tapes laid directly on the generally flat surface of a flexible diaphragm secured around the periphery of the transfer tool.

In yet another aspect the invention provides apparatus for laying a sheet of material on to a surface comprising a transfer tool for transferring a layer of said material between various stages of a manufacturing process, said transfer tool having a transfer surface, a flexible diaphragm fluid tightly attached across said surface and means for introducing pressurised fluid so that during certain phases of operation the diaphragm is stretched so as to form a curved convex protrusion.

The transfer surface may be shaped so as to conform during certain phases of operation with the shape of the surface of a forming tool into which said layer of material is to be transferred.

Means may also be provided for establishing a vacuum inside the diaphragm during certain phases of operation to draw the diaphragm into contact with the transfer surface.

In yet another aspect the invention provides apparatus for the manufacture of a helicopter rotor blade from pre-impregnated fibre-reinforced material including a cutting table in which sheets of said material to be used in the manufacture of the blade are cut to a desired profile, a mould tool in which said sheets are laid and subsequently cured by the application of heat and pressure, and a transfer tool for transferring sheets from the cutting table to a desired location in the mould tool, said transfer tool having a transfer surface covered by a flexible diaphragm on which the sheet is transferred and means for inflating the diaphragm after location of the sheet in the mould tool, whereby as the transfer tool is withdrawn from the mould tool the diaphragm automatically assumes a varying curved convex shape so that the diaphragm is peeled gradually from the surface of the sheet of material inwardly from an outer edge region.

BRIEF DESCRIPTION OF THE DRAWINGS

The invention will now be described by way of example only and with reference to the accompanying drawings in which.

DETAILED DESCRIPTION OF THE INVENTION

Figure 1:
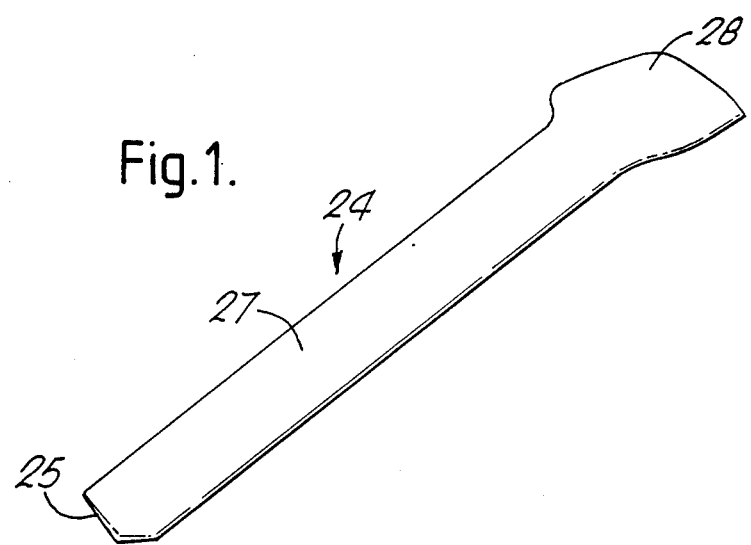
FIG. 1 is a perspective view of a helicopter rotor blade constructed using the method and apparatus of this invention.

Referring now to FIG. 1, a helicopter main sustaining rotor blade 24 constructed of pre-impregnated fibre-reinforced material includes a root end 25 adapted for attachment to a rotor hub (not shown), a central parallel portion 27 having an aerofoil cross sectional shape and a tip portion 28 having an intricate plan form profile.

Whilst the operational characteristics of such a plan form are not of concern as far as the present invention is concerned, nevertheless it is in the manufacture of such intricately shaped areas that this invention is particularly advantageous, especially in association with an automated facility in which such manufacture is to be accomplished. Thus in the manufacture of the tip portion 28 it is necessary to incorporate individually profiled sheets of pre-impregnated fibre-reinforced material accurately and repetitively in a mould tool.

Figure 2:
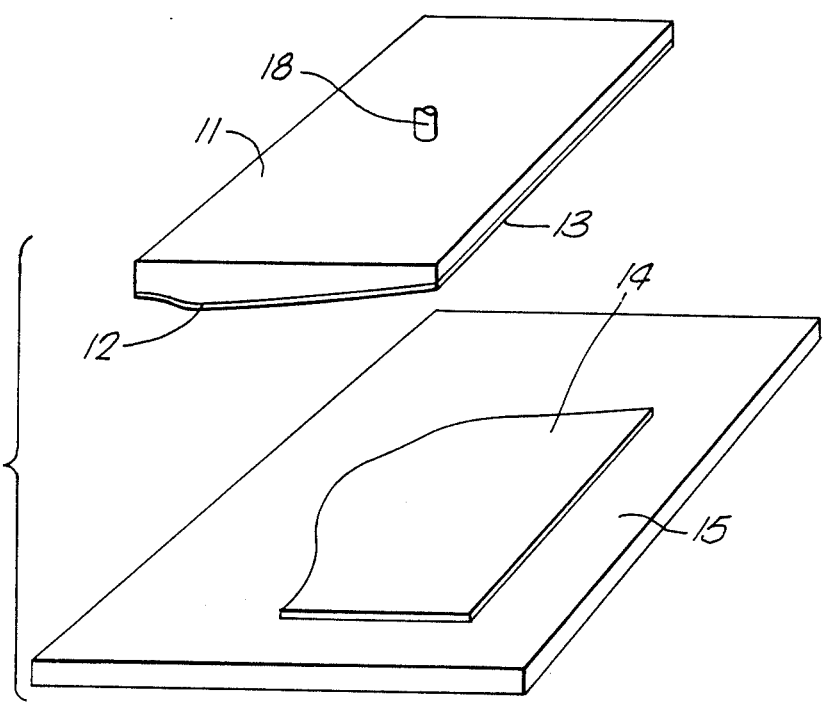
FIGS. 2 to 7 inclusive are schematic illustrations of apparatus, for laying a sheet of pre-impregnated fibre-reinforced material on to a surface, constructed according to one embodiment of the invention and illustrating a sequence of steps of one method of use.
Figure 3:
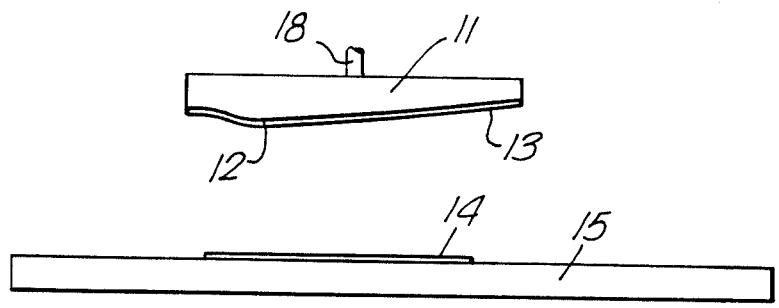
Figure 4:
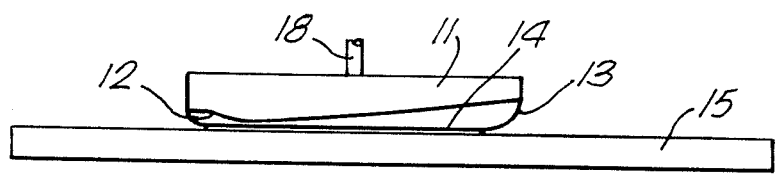

Referring now to FIG. 2, a transfer tool 11 has a surface 12 shaped to conform to the shape of the surface of a forming tool (not shown) with which it is to be used. A flexible diaphragm 13 is fluid tightly attached around the periphery of transfer tool 11 and a pipe 18 protruding from the rear surface of tool 11 is provided for selectively connecting a supply of pressurised fluid or a source of vacuum to the interior of the diaphragm 13.

In one form of the invention the transfer tool 11 is used in an automated manufacturing process for manufacturing the helicopter main rotor blade 24 illustrated in FIG. 1. In particular the tool 11 is used in the construction of the intricately shaped tip portion 28 of the blade by transferring sheets of pre-impregnated fibre-reinforced material cut to a desired profile on a cutting table to a mould tool in which the rotor blade is eventually cured by the application of heat and pressure. A sequence of steps involved in a method according to one embodiment of the invention will now be described with reference to FIGS. 3 to 7 inclusive.

A sheet 14 of pre-impregnated fibre-reinforced material is cut from a roll of material on a generally flat cutting table 15 to a predetermined profile shape required in the tip area 28 of the helicopter rotor blade 24 (FIG. 1). The transfer tool 11 is located with the flexible diaphragm 13 lowermost and is lowered until the diaphragm 13 just contacts the upper surface of sheet 14.

Figure 5:
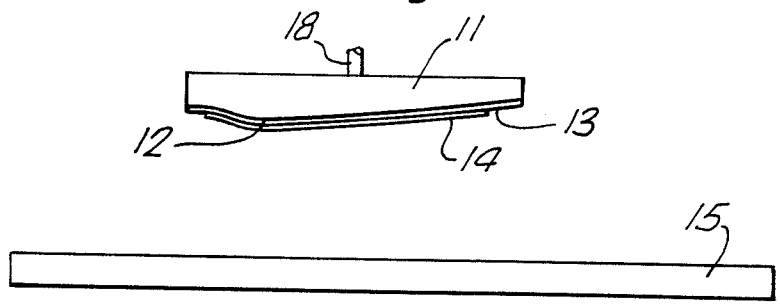

Air pressure is introduced through pipe 18 to inflate the diaphragm 13 (FIG. 4) so that a uniform pressure is applied over the entire surface of the sheet 14 which due to the aforementioned natural tackiness of the material, ensures that the sheet 14 adheres to the surface of the diaphragm 13. The air pressure is released and a source of vacuum applied through pipe 18 to draw the diaphragm 13 and attached sheet 14 into conformity with the shape of the lower surface 12 of transfer tool 11, as illustrated in FIG. 5.

Figure 6:
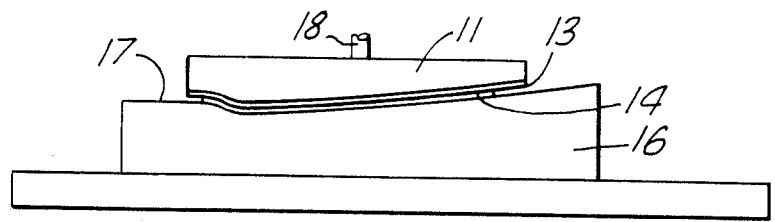

Transfer tool 11 is then moved to a mould tool 16 having an upper profiled surface 17 shaped to conform to the external shape of one half of the rotor blade 24. The transfer tool 11 is lowered until the sheet 14 is correctly positioned in the tip area 28 of the blade and in contact with surface 17 as shown in FIG. 6.

Figure 7:
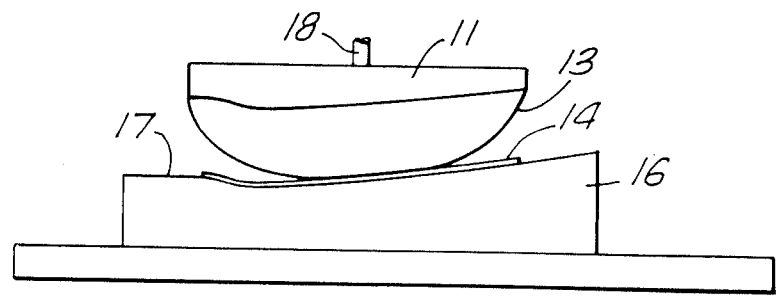

Air pressure is again introduced through pipe 18 to inflate diaphragm 13 and provide a substantially uniform pressure forcing the sheet 14 into contact with surface 17 of mould tool 16. Transfer tool 11 is then slowly withdrawn from tool 16 as shown in FIG. 7 which causes stretching of diaphragm 13 under the influence of the inflation pressure so that the surface of the diaphragm 13 assumes a convex surface that is presented towards tool 16, the curvature varying as the separation distance increases. This causes the surface of the diaphragm 13 to be peeled gradually away from the surface of sheet 14 inwardly from its edge region so as to release a gradually increasing area of the upper surface of sheet 14.

The adhesion between the whole of the area of the lower surface of sheet 14 and the surface of the tool 16 is greater than that between the upper surface of sheet 14 and the small area of the diaphragm 13 that is being continuously peeled away which ensures that the sheet 14 is retained in the mould tool 16 whilst the transfer tool 11 is withdrawn.

The process is then repeated until the desired thickness of material has been built up in the tool 16. In such a multi-layer lay-up it is essential that the sheets are properly de-bulked by removal of any air trapped between adjacent sheets, and the pressure applied by the inflated diaphragm 13 ensures that this is achieved automatically during withdrawal of the transfer tool 11.

The lay-up procedure is repeated in a second identical mould tool 16 to produce the other half of the rotor blade 24, whereafter the two are joined and the lay-up cured by the application of heat and pressure to form the complete rotor blade 24.

In a further unillustrated embodiment the desired thickness of material can be built up on the surface of the diaphragm 13 on the transfer tool 11 itself either automatically as described or by hand lay-up of individual sheets 14 previously cut to a desired profile. In such an embodiment it is desirable that the multi-layer lay-up is de-bulked prior to being transferred to the surface 17 of mould tool 16.

Figure 8:
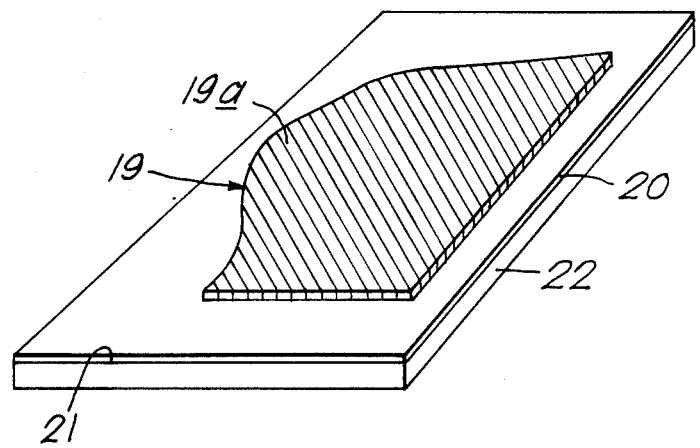
FIGS. 8 to 10 inclusive are schematic illustrations of apparatus, for laying a sheet of pre-impregnated fibre-reinforced material on to a surface, constructed according to another embodiment of the invention and illustrating a sequence of steps of a further method of use.
Figure 9:
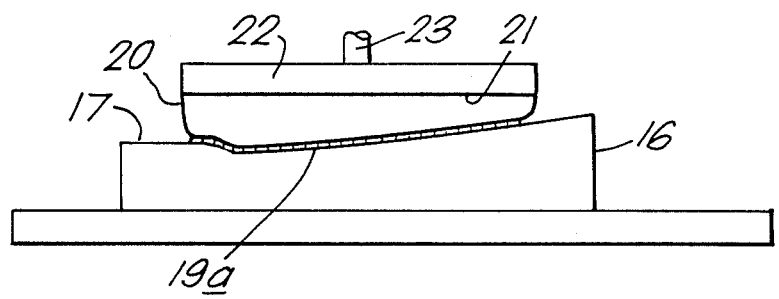
Figure 10:
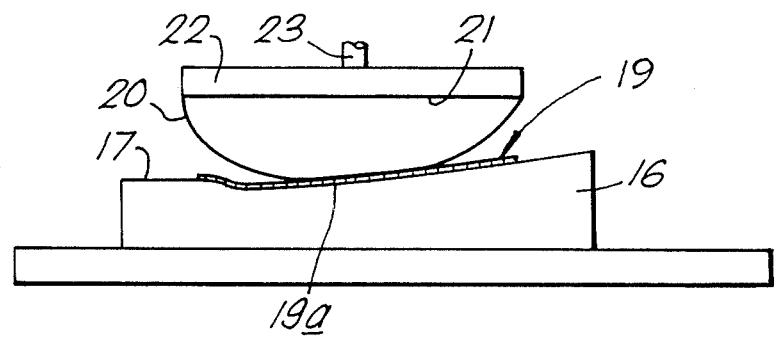

In a further embodiment illustrated in FIGS. 8 to 10 inclusive adapted for use with the aforementioned tape laying manufacturing technique, the shaped sheet of pre-impregnated fibre-reinforced material 19 is made up of a plurality of adjacently laid narrow tapes 19a. The tapes 19a are laid by a tape laying machine directly on the surface of a flexible diaphragm 20 secured around the periphery of a flat surface 21 of a transfer tool 22 as shown in FIG. 8.

Transfer tool 22 is then inverted as shown in FIG. 9, located above the mould tool 16 and the diaphragm 20 is inflated through pipe 23 to provide a substantially uniform pressure forcing the sheet 19 comprising tapes 19a into contact with surface 17 of mould tool 16. As in the previous embodiment, the transfer tool 22 is then slowly withdrawn from mould tool 16 as shown in FIG. 10 which causes stretching of the diaphragm 20 so that it is peeled gradually away from the surface of the sheet 19 inwardly from its edge region.

It will be apparent that in a further unillustrated embodiment the tapes 19a could be laid up on a flat surface similar to the cutting table 15 of the embodiment of FIGS. 2 to 7, and transferred to the mould tool 16 using either the transfer tool 11 of FIGS. 2 to 7 inclusive or the transfer tool 22 of the embodiment of FIGS. 8 to 10 inclusive. Both alternatives represent a simpler operation than the current technique of laying tape directly on to the concave surface such as surface 17 of mould tool 16.

Thus, this invention overcomes the aforementioned problem by ensuring efficient transfer of a sheet of tacky material from a transfer tool on to a curved surface of a mould tool and therefore makes possible automated techniques in the manufacture of composite components to improve consistency of the products and minimise manufacturing costs.

The invention has been described and illustrated with particular reference to the laying of pre-impregnated fibre-reinforced materials and to the use of such materials in the manufacture of a helicopter blade, however, the invention can of course be used with other materials and in the manufacture of other components such as wing sections and body panels for fixed wing aircraft.

Whilst several embodiments of the invention have been described and illustrated it will be apparent that many modifications may be made without departing from the scope of the invention as defined in the appended claims. For example in some cases it may be necessary to shape the external profile of the transfer tool to conform to the shape of a cavity in a mould tool in which the sheets of material are to be laid.

What is claimed is:

1. A method for laying a sheet of pre-impregnated fibre-reinforced material onto a moulding surface, comprising the steps of:
   providing an inflatable transfer tool having a flexible diaphragm attached to a periphery of the transfer tool,
   picking up the sheet of pre-impregnated fibre-reinforced material on an external face of the flexible diaphragm,
   locating the transfer tool so that said sheet is in contact with the moulding surface with diaphram deflated,
   inflating the flexible diaphragm whereby a substantially uniform pressure is applied to force the sheet into contact with the moulding surface,
   withdrawing the transfer tool from the moulding surface while maintaining the diaphragm inflated to cause the diaphragm to stretch under influence of the inflating pressure so as to take up a varying curved shape as the transfer tool is withdrawn from the moulding surface whereby the diaphragm is peeled gradually from the external face of the sheet of material inwardly from its outer edge region, and
   removing the transfer tool from the sheet of material.

2. A method for laying a sheet of pre-impregnated fibre-reinforced material onto a moulding surface comprising the steps of:
   cutting the sheet of pre-impregnated fibre-reinforced material to a desired profile on a generally flat cutting table,
   providing a transfer tool having a flexible diaphragm attached to a periphery of the transfer tool,
   locating the transfer tool in proximity with the sheet of material on the cutting table,
   inflating the diaphragm to an inflating pressure to apply a uniform pressure over the surface of the sheet of material so that the sheet of material becomes attached to the external face of the diaphragm of the transfer tool,
   releasing the inflating pressure,
   withdrawing the transfer-tool with attached sheet of material from the cutting table,
   locating the transfer tool so that said sheet is in contact with the moulding surface,
   inflating the flexible diaphragm to an inflating pressure whereby a substantially uniform pressure is applied to force the sheet into contact with the moulding surface,
   withdrawing the transfer tool from the moulding surface while maintaining the diaphragm inflated to cause the diaphragm to stretch under influence of the inflation pressure so as to take up a varying curved shaped as the transfer tool is withdrawn from the moulding surface whereby the diaphragm is peeled gradually from the sheet of material inwardly from its outer edge region, and
   removing the transfer tool from the sheet of material.

3. A method according to claim 2, wherein a vacuum is applied following deflation of the diaphragm whereby the diaphragm and attached sheet of material are drawn into conformity with the shape of the adjacent face of the transfer tool.

4. A method for laying a sheet of pre-impregnated fibre-reinforced material onto a moulding surface comprising the steps of:
   providing a transfer tool having a flexible diaphragm attached to a periphery portion of the transfer tool,
   forming the sheet of material to a desired profile using a plurality of adjacent narrow tapes laid directly on a generally flat surface,
   locating the transfer tool in proximity with the sheet of material on the flat surface,
   inflating the diaphragm to an inflation pressure to apply uniform pressure over a surface of the sheet of material so that the sheet of material becomes attached to an external face of the diaphragm of the transfer tool,
   releasing the inflation pressure,
   withdrawing the transfer tool and attached sheet of material from the flat surface,
   locating the transfer tool so that said sheet is in contact with the moulding surface,
   inflating the flexible diaphragm whereby a substantially uniform pressure is applied to force the sheet into contact with the moulding surface,
   withdrawing the transfer tool from the moulding surface while maintaining the diaphragm inflated to cause the diaphragm to stretch under influence of the inflation pressure so as to take up a varying curved shape as the transfer tool is withdrawn from the moulding surface whereby the diaphragm is peeled gradually from the external face the sheet of material inwardly from its outer edge region, and removing the transfer tool from the sheet material.

5. A method according to claim 4, wherein a vacuum is applied following deflation of the diaphragm whereby the diaphragm and attached sheet of material are drawn into conformity with the shape of the adjacent face of the transfer tool.

6. A method for laying a sheet of pre-impregnated fibre-reinforced material onto a moulding surface comprising the steps of:
providing a transfer tool having an inflatable flexible diaphragm attached to a periphery of the transfer tool,
forming the sheet of material to a desired profile using a plurality of adjacent narrow tapes picked up on a surface of the flexible diaphragm,
locating the transfer tool so that said sheet is in contact with the moulding surface with the flexible diaphragm deflated,
inflating the flexible diaphragm whereby a substantially uniform pressure is applied to force the sheet into contact with the moulding surface,
withdrawing the transfer tool from the moulding surface while maintaining the diaphragm inflated to cause the diaphragm to stretch under influence of the inflating pressure so as to cause said diaphram to take up a varying curved shape as the transfer tool is withdrawn from the moulding surface whereby the diaphragm is peeled gradually from the sheet of material inwardly from an outer edge region of the sheet, and
removing the transfer tool from the sheet of material.

* * * * *